Nov. 26, 1968  W. C. CARMICHAEL  3,413,057
SPECTACLE SUPPORTED PIVOTED AUXILIARY EYE PROTECTORS
Original Filed Jan. 11, 1963
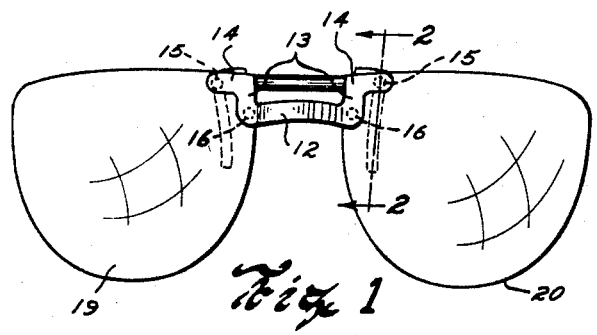
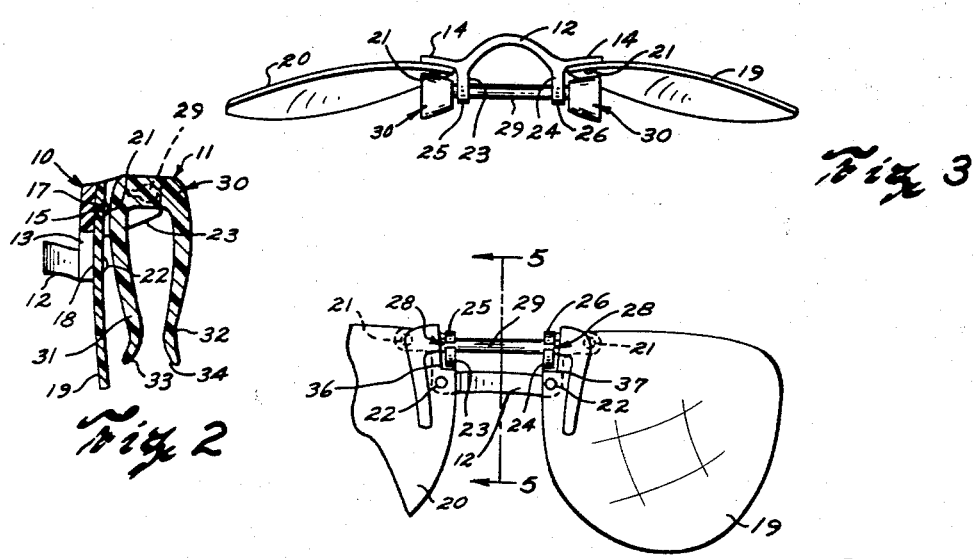
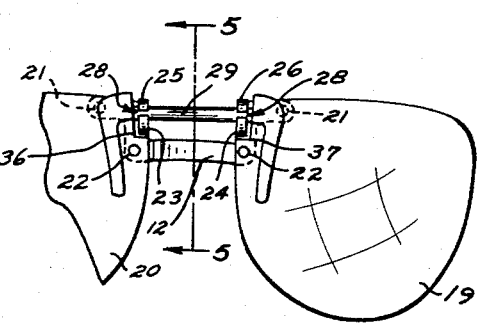
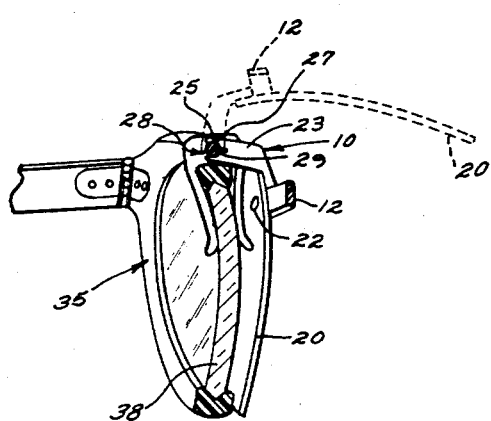
INVENTOR.
WALTER C. CARMICHAEL
BY
ATTORNEY

United States Patent Office 3,413,057
Patented Nov. 26, 1968

3,413,057
SPECTACLE SUPPORTED PIVOTED AUXILIARY EYE PROTECTORS
Walter C. Carmichael, West Peabody, Mass., assignor, by mesne assignments, to American Optical Corporation, a corporation of Delaware
Continuation of application Ser. No. 250,823, Jan. 11, 1963. This application Sept. 22, 1965, Ser. No. 489,369
1 Claim. (Cl. 351—47)

ABSTRACT OF THE DISCLOSURE

Auxiliary sunglasses which can be clipped onto wearer's own glasses whether rimless, metal rimmed or plastic frame and swing into and out of postion over the lenses of the glasses as desired.

---

This application is a continuation of application Ser. No. 250,823, filed Jan. 11, 1963 now abandoned.

This invention relates to auxiliary eye protectors of the type embodying eye shields adapted to be detachably mounted on ordinary primary spectacles or the like and which embody supporting means for said eye shields whereby they may be raised or lowered relative to the lenses of such spectacles.

Auxiliary eye protectors of the nature embodying the invention are generally known in the art. However, most such prior art eye protectors embodied complex structures whose parts were not only expensive to manufacture but were time-consuming and difficult to assemble.

The primary object, therefore, of the present invention is to provide a greatly simplified construction of auxiliary eye protector which, although very efficient in use, may be manufactured at an extremely low cost and whose parts may be quickly and easily assembled.

Another object is to provide an eye protector of the above character which consists of two major supporting parts capable of being fabricated as two separate units which may be quickly and easily snapped into hinged relation with each other without the use of tools and to which the eye shield portions may be quickly and easily attached without the use of separate securing means.

A further object is to provide an auxiliary eye protector of the above character which is light in weight and pleasing in appearance.

Other objects and advantages of the invention will become apparent from the following description when taken in conjunction with the accompanying drawings in which:

FIG. 1 is a front view of the auxiliary eye protector embodying the invention;

FIG. 2 is an enlarged fragmentary sectional view taken as on line 2—2 of FIG. 1 and looking in the direction of the arrows;

FIG. 3 is a top plan view of the eye protector;

FIG. 4 is a fragmentary rear elevational view of the eye protector and

FIG. 5 is a slightly enlarged sectional view taken on line 5—5 of FIG. 4 looking in the direction of the arrows and showing the eye protector in position of use on a primary spectacle.

Referring more particularly to the drawings wherein like characters of reference designate like parts throughout the several views, the device of the invention embodies, as shown more clearly in FIG. 2, two major eye shield or lens supporting units 10 and 11 preferably formed of a plastic material having suitable resiliently yieldable characteristics such as polyethylene which may be fabricated by an injection-molding technique. The unit 10 comprises a central forwardly curving bridge portion 12 which, as shown particularly in FIGS. 1 and 2, has enlarged opposite integral ends each comprising a vertically disposed portion 13 having a right-angular and outwardly extending portion 14. The portions 13 and 14 are respectively provided with rearwardly extending integral pins 15 and 16 which are adapted to be extended through suitable perforations 17 and 18 formed in eye shield portions 19 and 20. The pins are adapted to be headed-over, as shown at 21 and 22 in FIG. 2, by applying heat and pressure on the exposed ends thereof, in a conventional manner, to secure the eye shield portions 19 and 20 to said respective portions 13 and 14. The vertically extending portions 13, as shown in FIGS. 2 through 5, are provided with integral rearwardly and slightly upwardly extending lugs 23 and 24 each of which terminates in a bifurcated end 25 and 26 respectively extending rearwardly from adjacent the opposite ends of the bridge portion in a given spaced relation with each other. The inner surfaces of each bifurcated end is preferably recessed and curved (as shown at 27 in FIG. 5) so as to provide a restricted mouth portion 28 through which the bar-like portion 29 of the unit 11 may be snapped. The inner curved surfaces 27 are so shaped and dimensioned as to retain a frictional pivotal contact with the bar-like portion 29. The opposed ends of the bar-like portion 29 are provided with integral portions 30 in the form of inverted U-shaped members spaced a distance apart an amount slightly greater than the spacing of the rearwardly extending lugs 23 and 24 and each having spaced depending portions 31 and 32 disposed in converging relation with each other and which terminate in diverging end portions 33 and 34 respectively, see FIGS. 2 and 5. The said depending portions 31 and 32, being formed of plastic material having resilient yielding characteristics, function as spring fingers whereby the auxiliary eye protector may be clamped onto a primary spectacle or the like 35, as shown in FIG. 5. It is further pointed out that the respective eye shield portions 19 and 20 have cut-out areas 36 and 37 to provide clearance for the rearwardly disposed lugs 23 and 24.

The supporting unit 10, which, as previously stated, can be fabricated as a unit by an injection-molding technique, comprises the central bridge portion 12, the integrally vertically disposed portions 13, outwardly angled portions 14, pin members 15 and 16 and the rearwardly extending lugs 23 and 24 having the bifurcated ends 25 and 26. The supporting unit 11 comprises the central bar portion 29 and the integral inverted U-shaped portions 30 and can also be injection-molded as a separate unit. The units 10 and 11 can thereafter be quickly and easily assembled by merely snapping the bar portion 29 inwardly of the bifurcated ends 25 and 26 without the use of separate tools.

The eye shield portions 19 and 20 are preferably formed of thin plastic sheet material having desired light or other absorptive characteristics and, as previously stated above, are each provided with cut-out areas 36 and 37 to fit about the respective portions 23 and 24 and are further provided with spaced openings adapted to fit over the integral rearwardly extending pins 15 and 16. The eye shield portions may thereafter be secured to said portions 13 and 14 by applying heat and pressure to the protruding ends of the pins 15 and 16 to head them over in a conventional manner and by the use of conventional means.

The resulting device is extremely simple in construction, light in weight, and may be very economically manufactured and easily assembled.

As shown by the full and dash lines in FIG. 5, the eye shield portions 19 and 20 may be raised or lowered relative to the lenses 38 of the primary spectacles and are held in said adjusted positions by the frictional spring action of the bifurcated ends 25 and 26, it being understood that the inner curved surfaces 27 of said bifurcated ends are so formed and dimensioned as to retain frictional engagement with the bar member 29 when snapped through the mouth portions of said bifurcated ends.

From the foregoing description, it will be seen that simple, efficient, and economical means have been provided for accomplishing all of the objects and advantages of the invention.

Having described my invention, I claim:

1. An auxiliary eye protector for attachment to a pair of spectacles comprising a first integrally molded supporting unit embodying a bridge portion having right-angularly disposed end portions, an eye shield fixedly secured to each of said end portions, said eye shields being so curved as to lie closely over the lenses of said spectacles, said eye shields being supported in spaced relation with each other by said bridge portion, said end portions each having a lug extending rearwardly thereof from adjacent the ends of the bridge portion, said lugs being at a given spaced relation with each other and each terminating in a bifurcated end having a restricted mouth portion and oppositely curved surfaces on the respective inner sides of the branches of said bifurcated ends, the curvatures of said surfaces and the distance therebetween being controlled to receive and to maintain frictional engagement with a bar portion to be positioned therein, a second integrally molded supporting unit comprising a bar portion of a diameter greater than the distance between said curved surfaces, said bar portion having inverted U-shaped members on the opposite ends thereof each formed with spaced downwardly and inwardly converging resilient and yieldable portions which constitute the respective branches of said inverted U-shaped members, said U-shaped members being spaced from each other at the ends of said bar an amount slightly greater than the distance between said lugs and a lesser distance at the free ends of the branches of said members, said bar portion being adapted to be snapped inwardly of the respective bifurcated ends so as to be frictionally and pivotally engaged between said curved surfaces of said lugs.

References Cited

UNITED STATES PATENTS

| | | | |
|---|---|---|---|
| 1,249,908 | 12/1917 | Day | 351—47 |
| 1,709,195 | 4/1929 | Shindel | 351—47 |
| 1,899,905 | 2/1933 | Uhlemann | 351—57 X |
| 2,132,346 | 10/1938 | Richards | 351—47 |
| 2,671,379 | 3/1954 | Eloranta | 351—111 |
| 2,680,847 | 6/1954 | Ball | 351—44 X |
| 2,714,717 | 8/1955 | Allman | 351—47 X |
| 2,818,774 | 1/1958 | Olnhausen | 351—57 |

FOREIGN PATENTS

| | | |
|---|---|---|
| 305,513 | 2/1929 | Great Britain. |
| 1,097,716 | 1/1961 | Germany. |

DAVID H. RUBIN, *Primary Examiner.*